US012712273B2

(12) United States Patent
Xue et al.

(10) Patent No.: US 12,712,273 B2
(45) Date of Patent: Aug. 18, 2026

(54) HIGH PERFORMANCE PATCH-TYPE RADIATING ELEMENTS FOR MASSIVE MIMO COMMUNICATION SYSTEMS

(71) Applicant: Outdoor Wireless Networks LLC, Claremont, NC (US)

(72) Inventors: Cheng Xue, Suzhou (CN); Bo Wu, Suzhou (CN); Yuemin Li, Suzhou (CN); Rui An, Allen, TX (US); Jian Zhang, Suzhou (CN); Bin Sun, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 64 days.

(21) Appl. No.: 18/717,738

(22) PCT Filed: Dec. 17, 2021

(86) PCT No.: PCT/CN2021/139259
§ 371 (c)(1),
(2) Date: Jun. 7, 2024

(87) PCT Pub. No.: WO2023/108630
PCT Pub. Date: Jun. 22, 2023

(65) Prior Publication Data

US 2025/0046999 A1 Feb. 6, 2025

(51) Int. Cl.
*H01Q 9/04* (2006.01)
*H01Q 25/00* (2006.01)

(52) U.S. Cl.
CPC ........... *H01Q 9/0442* (2013.01); *H01Q 9/045* (2013.01); *H01Q 25/001* (2013.01)

(58) Field of Classification Search
CPC .... H01Q 9/0442; H01Q 9/045; H01Q 25/001; H01Q 1/246; H01Q 9/0457; H01Q 21/065; H01Q 21/24
See application file for complete search history.

(56) References Cited

U.S. PATENT DOCUMENTS

| | | | |
|---|---|---|---|
| 5,448,250 | A | 9/1995 | Day |
| 2007/0152901 | A1 | 7/2007 | Hockey et al. |
| 2018/0090815 | A1 | 3/2018 | Shirinfar et al. |

FOREIGN PATENT DOCUMENTS

| | | | | |
|---|---|---|---|---|
| CN | 106602267 | A * | 4/2017 | ............... H01Q 5/10 |
| CN | 110098477 | A | 8/2019 | |

(Continued)

OTHER PUBLICATIONS

International Search Report and the Written Opinion of the International Searching Authority corresponding to International Patent Application No. PCT/CN2021/139259 (9 pages) (mailed May 30, 2022).

*Primary Examiner* — Dieu Hien T Duong
(74) *Attorney, Agent, or Firm* — Myers Bigel, P.A.

(57) ABSTRACT

An antenna includes a cross-polarized feed signal network configured to convert first and second RF input feed signals to first and second pairs of cross-polarized feed signals at respective first and second pairs of feed signal output ports. A patch radiating element is provided, which is electrically coupled to the first and second feed signal output ports. The patch radiating element includes an electrically conductive forward-facing surface thereon, which is segmented into four quadrants by four generally L-shaped slots within the electrically conductive forward-facing surface. These four generally L-shaped slots are positioned back-to-back relative each other so that a cross-shaped portion of the electrically conductive forward-facing surface extends between the four generally L-shaped slots and radially outward towards four respective points on a perimeter of the patch radiating element.

16 Claims, 17 Drawing Sheets

(56) References Cited

FOREIGN PATENT DOCUMENTS

| | | | | | |
|---|---|---|---|---|---|
| CN | 110880645 | A | | 3/2020 | |
| CN | 111541010 | A | | 8/2020 | |
| CN | 211743399 | U | | 10/2020 | |
| CN | 112886229 | A | | 6/2021 | |
| WO | 2011076135 | A1 | | 6/2011 | |
| WO | WO-2020242783 | A2 | * | 12/2020 | ........... H01Q 9/0435 |

* cited by examiner

HIGH PERFORMANCE PATCH-TYPE RADIATING ELEMENTS FOR MASSIVE MIMO COMMUNICATION SYSTEMS

FIELD OF THE INVENTION

The present invention relates to antenna devices and, more particularly, to patch-type radiating elements and antenna arrays for wireless communication systems.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is generally perpendicular relative to the plane defined by the horizon. Reference will also be made herein to (1) the azimuth plane, which refers to a plane that bisects the base station antenna that is parallel to the plane defined by the horizon and (2) to the elevation plane, which refers to a plane extending along the boresight pointing direction of the base station antenna that is perpendicular to the azimuth plane.

A very common base station configuration is a so-called "three sector" configuration in which the cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that the antenna beams provide good coverage throughout a 120° sector. Three of these base station antennas will therefore provide full 360° coverage in the azimuth plane. Typically, each base station antenna will include a so-called linear array of radiating elements that includes a plurality of radiating elements that are arranged in a vertically-extending column. Each radiating element may have a HPBW of approximately 65° so that the antenna beam generated by the linear array will provide coverage to a 120° sector in the azimuth plane. By providing a column of radiating elements extending along the elevation plane, the elevation HPBW of the antenna beam may be narrowed to be significantly less than 65°, with the amount of narrowing increasing with the length of the column.

As demand for cellular service has grown, cellular operators have upgraded their networks to dramatically increase network capacity and to support new generations of service. The new generations of service that have been added typically operate in different frequency bands from existing generations to avoid interference. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more different types or generations of cellular service. To reduce the number of antennas on the towers of such base stations, many operators deploy antennas that communicate in multiple frequency bands to support multiple different cellular services.

One way of supporting service in multiple frequency bands from a single base station antenna is to include multiple linear arrays of radiating elements on the antenna, with different ones of the linear arrays operating in different frequency bands. Another approach is to use so-called "wideband" radiating elements that can transmit and receive RF signals in more than one frequency band. For example, there are a number of different frequency bands in the 1.7-2.7 GHz frequency range including the 1695-2180 MHz band and the 2490-2690 MHz band. Wideband radiating elements are known in the art that can transmit signals that are anywhere within the 1.7-2.7 GHz frequency range. Diplexers may be included in the base station antenna that combine signals from both the lower band (here the 1695-2180 MHz band) and the higher band (here the 2490-2690 MHz band) in the transmit path for transmission through a single array of radiating elements, and that divide out signals in the receive path to provide the lower band signals to a lower band radio and the higher band signals to a higher band radio. Thus, the use of wideband radiating elements may allow a single array of radiating elements to support service in multiple frequency bands.

As the volume of cellular traffic continues to grow, cellular operators are also under pressure to support increased levels of capacity per base station in various of the frequency bands. Several known techniques for increasing capacity include the use of high gain beam-forming antennas, the use of multi-input-multi-output or ("MIMO") transmission techniques and the use of sector-splitting.

Beam-forming antennas refer to antennas that have multiple columns of radiating elements that are fed by different ports of a radio. A radio may modulate an RF signal and then send it to transceivers associated with each output port of the radio ("radio port"). The amplitude and phase of the RF signal for each radio port may be set by the radio so that the columns of radiating elements work together to form a more focused, higher gain antenna beam that has a narrowed beam width in, for example, the azimuth plane or in both the azimuth and elevation planes. The antenna beam can typically be scanned over a wide range of pointing angles in the azimuth and/or elevation planes (i.e., scanned off of the boresight pointing direction of the antenna) by appropriate adjustments to the amplitude and phase of the RF signal for each radio port. The size and/or pointing direction of the antenna beams may be changed on a time slot-by-time slot basis in a time division duplex (TDD) transmission scheme in order to increase the antenna gain in the direction of selected users during each time slot. The column spacing (i.e., the horizontal distance between adjacent vertically-oriented linear arrays of radiating elements) of a beam-forming antenna is typically relatively small (e.g., 0.65λ) or less, where λ is the wavelength of the center frequency of the operating frequency band). Since beam-forming antennas have the ability to generate narrow antenna beams, they may exhibit significantly higher antenna gains and thus support increased capacity and produce lower levels of interference with neighboring sectors.

MIMO operation is another technique for increasing the capacity of a base station. MIMO refers to a technique where multiple data streams are output through respective ports of a radio and transmitted through multiple different antenna arrays (or sub-arrays) that are, for example, spatially separated from one another and/or at orthogonal polarizations. MIMO exploits multipath propagation and hence may rely on the transmission paths being relatively independent, which generally requires a larger spacing between the columns of radiating elements (e.g., a spacing of a wavelength or more). MIMO also uses orthogonal frequency division multiplexing (FDM) to encode data channels and thereby support increased data capacity. The use of MIMO transmission techniques may help overcome the negative effects of multipath fading, reflections of the transmitted signal off of buildings and the like to provide enhanced transmission quality and capacity.

Sector-splitting refers to a technique where the coverage area for a base station is divided into more than three sectors, with six, nine and even twelve sectors being used in various sector-splitting applications. For example, a six sector base station will have six 60° sectors in the azimuth plane. Splitting each 120° sector into multiple smaller sub-sectors increases system capacity because each antenna can service a smaller area and therefore provide higher antenna gain, and because sector-splitting also may allow for frequency reuse within a 120° sector. In sector-splitting applications, a single multi-beam antenna is typically used for each 120° sector. The multi-beam antenna generates two or more antenna beams within the same frequency band, thereby splitting the sector into two or more smaller sectors. Sector-splitting typically requires multiple linear arrays of radiating elements. The two common approaches for sector-splitting are sector-splitting using beam-forming networks such as a Butler Matrix and sector-splitting using lensed antennas.

In the first sector-splitting approach, multiple linear arrays are connected to, for example, a pair of ports via a feed network that includes a Butler matrix or other beam-forming network. In a six-sector configuration where each 120° sector is split in two, the beam-forming network generates two independent, side-by-side antenna beams that each have an azimuth HPBW of about 33° and that together cover the 120° sector. The first port generates the first antenna beam and the second port generates the second antenna beam. Assuming that the boresight pointing direction for the sector is 0° in the azimuth plane, then the antenna beams will have azimuth pointing directions of about −30° and +30°, respectively.

In the second sector-splitting approach, an RF lens is included in the base station antenna and the multiple linear arrays are configured to transmit and receive signals in different directions through the RF lens. The RF lens may be used to narrow the azimuth beam width of the antenna beams generated by the linear arrays to beam widths that are suitable for providing service to a sub-sector. Thus, for example, for a six sector base station served by three base station antennas, the RF lens would be designed to narrow the azimuth HPBW of each antenna beam to about 33°.

SUMMARY OF THE INVENTION

Patch-type radiating elements having high cross-polarization ratio (CPR), high front-to-back ratio (FBR), narrower beamwidth, and high directivity are provided, which support high performance massive MIMO communication systems. According to some embodiments of the invention, an antenna is provided with a cross-polarized feed signal network and a patch radiating element thereon. The feed signal network is configured to convert first and second radio frequency (RF) input feed signals (IN1, IN2) into first and second pairs of cross-polarized feed signals at respective first and second pairs of feed signal output ports, and the patch radiating element is electrically coupled to the first and second feed signal output ports. In some embodiments, the patch radiating element has an electrically conductive forward-facing surface thereon that is segmented into four quadrants by four generally L-shaped slots within the electrically conductive forward-facing surface. These four generally L-shaped slots are positioned back-to-back relative each other so that a cross-shaped portion of the electrically conductive forward-facing surface extends between the four generally L-shaped slots and radially outward towards four respective points on a perimeter of the patch radiating element. In addition, in some embodiments, each of the L-shaped slots may include a respective linear slot segment having a generally L-shaped distal end. Moreover, in the event the patch radiating element has a generally rectangular-shaped perimeter, the cross-shaped portion of the electrically conductive forward-facing surface may extend radially outward towards four respective sides of the patch radiating element, and a center of the cross-shaped portion of the electrically conductive forward-facing surface may be aligned to a geometric center of the electrically conductive forward-facing surface. The use of a generally rectangular-shaped perimeter may provide some advantages in massive MIMO applications relative to circular or similar shapes (e.g., octagon-shaped), however, non rectangular-shaped perimeters are feasible (e.g., in microwave applications).

According to additional embodiments of the invention, the electrically conductive forward-facing surface is a metallized surface, which extends on a forward-facing surface of an underlying patch radiating element substrate, and the four generally L-shaped slots expose this forward-facing surface, but do not extend entirely through the patch radiating element substrate. The patch radiating element substrate may consist essentially of a dielectric polymer for low cost and high integration; however, other substrate materials may also be used. The four generally L-shaped slots may also be patterned such that the cross-shaped portion of the electrically conductive forward-facing surface includes a central hub portion and four spoke portions that extend radially outward at 0°, 90°, 180° and 270° from a center of the central hub portion. This central hub portion may have a generally circular shape when viewed from a plan perspective.

The antenna may further include four probes, which electrically couple respective ones of the four quadrants of the electrically conductive forward-facing surface of the patch radiating element to corresponding ones of the first and second pairs of feed signal output ports. In some embodiments, the four probes have distal ends that extend at least partially through the patch radiating element substrate. In other embodiments, four metallized-polymer probes may be provided, which are electrically connected to metallized contact patches on a rear-facing surface of the patch radiating element substrate. And, these metallized contact patches may be electrically connected by respective plated through-holes within the patch radiating element substrate to corresponding quadrants of the electrically conductive forward-facing surface. Advantageously, to support low cost manufacture, the patch radiating element substrate and the four metallized-polymer probes may be configured as a single piece unitary body, such as a three-dimensional (3D) nylon body having a fully or a selectively metallized surface(s) thereon.

In still further embodiments of the invention, the patch radiating element includes a polymer patch radiating element substrate, and the four generally L-shaped slots extend entirely through the polymer patch radiating element substrate. In these embodiments, the polymer patch radiating element substrate may include metallized forward-facing and metallized rear-facing surfaces, and the four generally L-shaped slots may have metallized sidewalls, which extend between the metallized forward-facing and metallized rear-facing surfaces. Four metallized-polymer probes may also be provided, which are electrically connected to the metallized rear-facing surface of the patch radiating element substrate. The patch radiating element substrate and the four metallized-polymer probes may be configured as a single piece unitary body.

According to still further embodiments of the invention, four probes may be provided, which have: (i) first ends electrically coupled to corresponding ones of the first and second pairs of feed signal output ports, and (ii) second arcuate-shaped ends, which extend on a rear-facing surface of the patch radiating element substrate. According to these embodiments, each of the second arcuate-shaped ends is capacitively coupled through the patch radiating element substrate to a corresponding one of the four quadrants of the electrically conductive forward-facing surface.

In still further embodiments of the invention, an antenna is provided with a patch radiating element that is electrically coupled to the first and second feed signal output ports. This patch radiating element has an electrically conductive forward-facing surface thereon that is segmented into four quadrants by a slot having a central hub segment and four, fork-shaped, spoke segments extending radially outward at 0°, 90°, 180° and 270° from to the central hub segment, when viewed from a plan perspective. In some of these embodiments, each of the fork-shaped spoke segments is configured to have a pair of segments at distal ends thereof that define two tines of the respective fork-shaped spoke segment, when viewed from the plan perspective. In addition, the electrically conductive forward-facing surface may be a metallized surface, which extends on a forward-facing surface of a patch radiating element substrate, and the central hub segment and the four fork-shaped spoke segments of the slot may be contiguous, and expose the forward-facing surface of the patch radiating element substrate (i.e., dielectric polymer). Four RF probes may also be provided, which electrically couple respective ones of the four quadrants of the electrically conductive forward-facing surface to corresponding ones of the first and second pairs of feed signal output ports. In some embodiments, these four RF probes have distal ends that extend at least partially through the patch radiating element substrate. However, in other embodiments, the probes are metallized-polymer probes, which are electrically connected to metallized contact patches on a rear-facing surface of the patch radiating element substrate. And, these metallized contact patches may be electrically connected by respective plated through-holes within the patch radiating element substrate to corresponding quadrants of the electrically conductive forward-facing surface. In some embodiments, (i) the patch radiating element substrate and the four metallized-polymer probes may be configured as a single piece unitary body, (ii) the central hub segment of the slot may have a generally circular shape when viewed from the plan perspective, and/or (iii) the central hub segment and the four fork-shaped spoke segments of the slot expose, but do not extend through, the patch radiating element substrate.

According to additional embodiments of the invention, a patch radiating element is provided, which has an electrically conductive forward-facing surface thereon that is segmented into four quadrants by two generally T-shaped slots within the electrically conductive forward-facing surface. These two generally T-shaped slots are positioned back-to-back relative each other so that a linear trace of the electrically conductive forward-facing surface extends uninterrupted between the two generally T-shaped slots. The electrically conductive forward-facing surface is a metallized surface, which extends on a forward-facing surface of a patch radiating element substrate, whereas the two generally T-shaped slots are configured to expose the forward-facing surface of the patch radiating element substrate. These two generally T-shaped slots may, or may not, extend through the patch radiating element substrate. Four probes are also provided, which electrically couple respective ones of the four quadrants of the electrically conductive forward-facing surface to corresponding ones of the first and second pairs of feed signal output ports. These four probes may have distal ends that extend at least partially through the patch radiating element substrate. Alternatively, four metallized-polymer probes may be provided, which are electrically connected to metallized contact patches on a rear-facing surface of the patch radiating element substrate. These metallized contact patches are electrically connected by respective plated through-holes within the patch radiating element substrate to corresponding quadrants of the electrically conductive forward-facing surface. The patch radiating element substrate and the four metallized-polymer probes may be configured as a single piece unitary body. Moreover, in the event the two generally T-shaped slots extend entirely through a polymer patch radiating element substrate, then the two generally T-shaped slots may have metallized sidewalls, which extend between metallized forward-facing and metallized rear-facing surfaces of the substrate.

Finally, according to further embodiments of the invention, the cross-polarized feed signal network includes a polymer feed board having a plurality of metallized traces thereon, which are electrically connected to the first and second pairs of feed signal output ports. This polymer feed board includes first and second input ports for receiving and distributing the first and second RF input feed signals to the plurality of metallized traces, as well as inter-column RF fences, which comprise a metallized polymer. The polymer feed board and the inter-column RF fences may be configured as a single piece unitary body. A rear-facing surface of the polymer feed board may also be metallized to thereby operate as an RF signal reflector.

DETAILED DESCRIPTION OF EMBODIMENTS

Figure 1A:
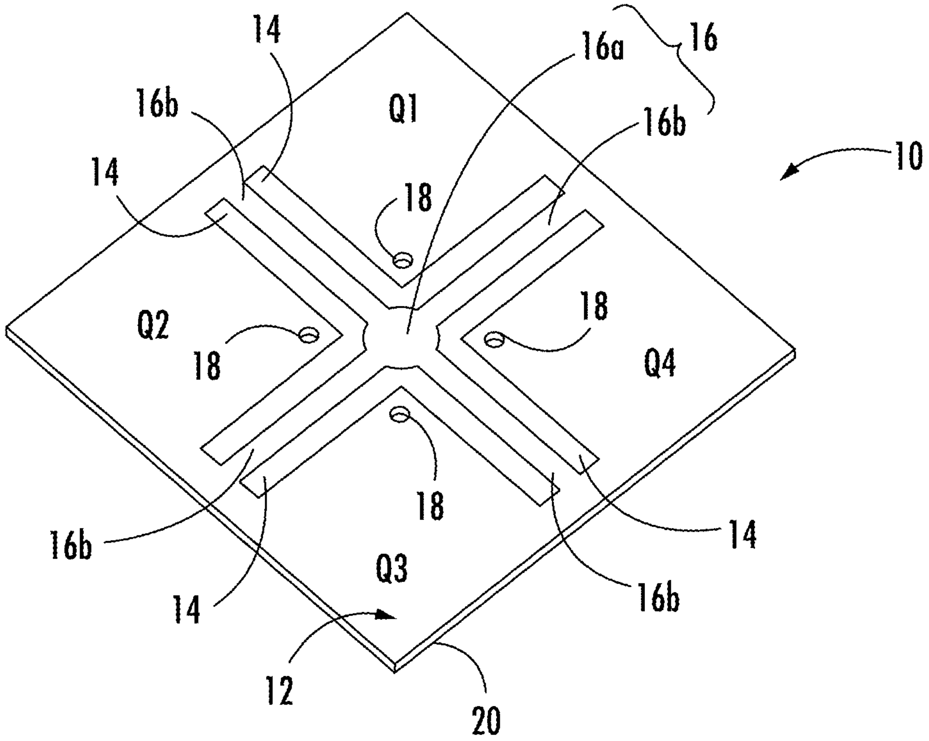
FIG. 1A is a perspective view of a metallized forward-facing surface of a rectangular-shaped patch radiating element having four L-shaped slots therein, according to an embodiment of the invention.
Figure 1B:
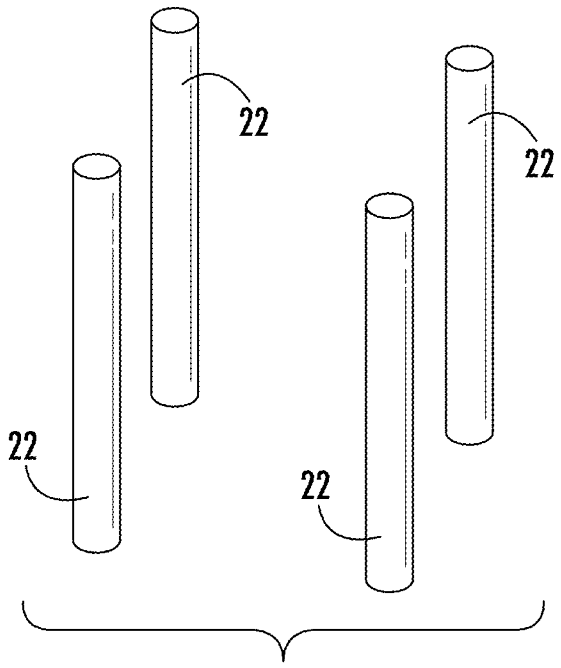
FIG. 1B is a perspective view of a quad arrangement of electrically conductive radio frequency (RF) signal probes, according to an embodiment of the invention.
Figure 1C:
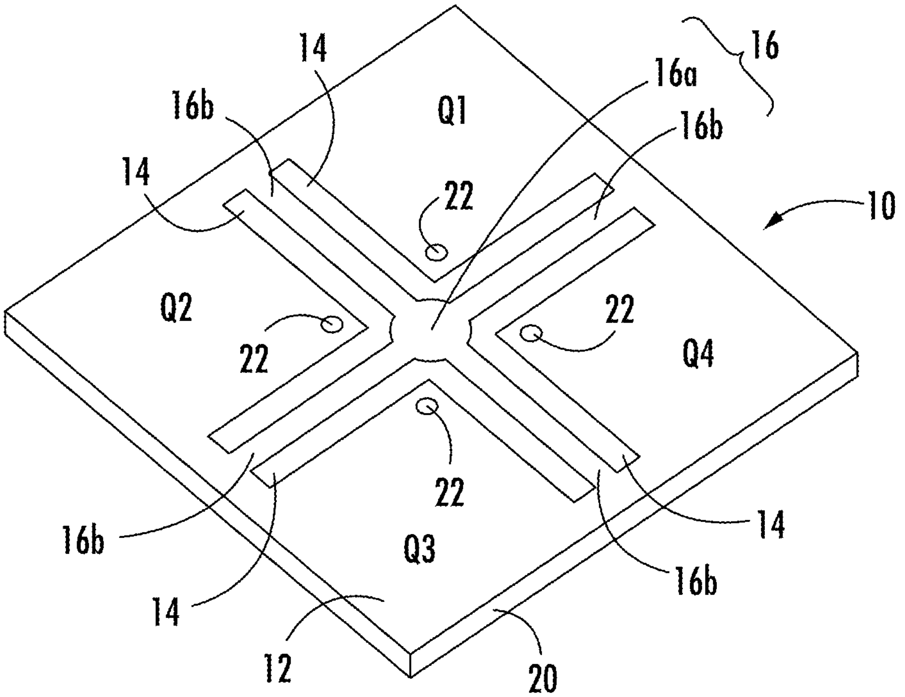
FIG. 1C is a perspective view of the rectangular-shaped patch radiating element of FIG. 1A having the RF signal probes of FIG. 1B extending therein, according to an embodiment of the invention.
Figure 1D:
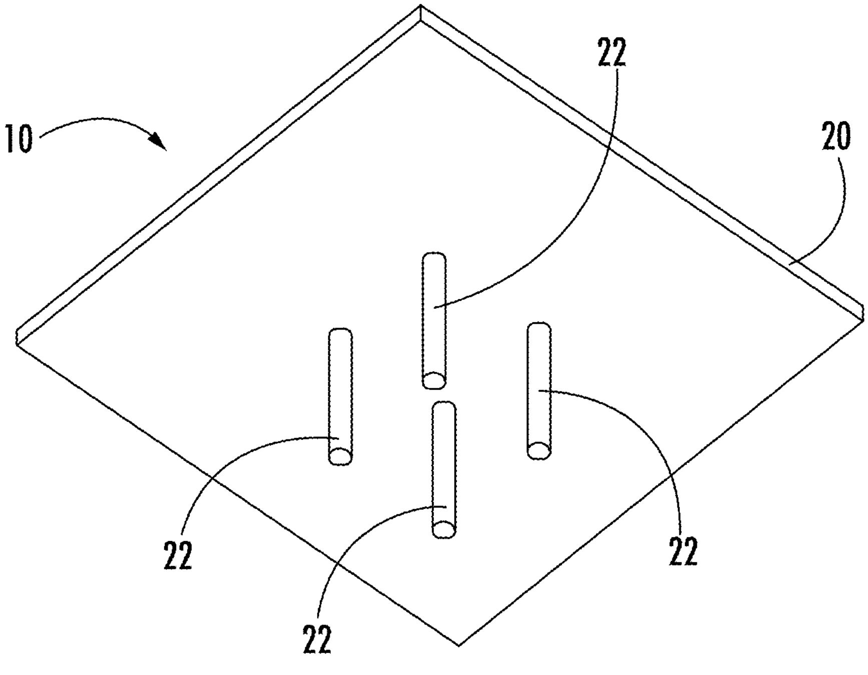
FIG. 1D is a perspective view of a rear-facing surface of the rectangular-shaped patch radiating element of FIG. 1A with the RF signal probes of FIG. 1B, according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIGS. 1A-1E, an antenna with high cross-polarization ratio (CPR), high front-to-back ratio (FBR), and high directivity for massive MIMO and other applications is illustrated as including a patch radiating element 10 (a/k/a patch radiator) having an electrically conductive forward-facing surface 12 thereon, which may be a metallized surface in some embodiments. As shown by FIG. 1A, this electrically conductive forward-facing surface 12 is segmented into four "radiating" quadrants (Q1-Q4) by four generally L-shaped slots 14, which expose an underlying patch radiating element substrate 20, such as a dielectric polymer (e.g., nylon) or printed circuit board (PCB) substrate having a four-sided rectangular (e.g., square) shape, for example. These four generally L-shaped slots 14 may be positioned back-to-back relative each other so that a cross-shaped portion 16 of the forward-facing surface 12 extends between the four generally L-shaped slots 14 and radially outward towards four points on a perimeter of the patch radiating element 10. According to some embodiments of the invention, the four points may be located at the mid points of the four sides. This cross-shaped portion 16 is shown as including a generally circular-shaped central hub portion 16*a* and four "orthogonal" spoke portions 16*b* that extend radially outward at 0°, 90°, 180° and 270° from a center of the central hub portion 16*a*, which is preferably aligned to a geometric center of the electrically conductive forward-facing surface 12. However, as explained hereinbelow with respect to FIGS. 5A, 6A-6C and 8A-8C, other embodiments of the invention may omit the circular-shaped central hub portion 16*a*.

Figure 1E:
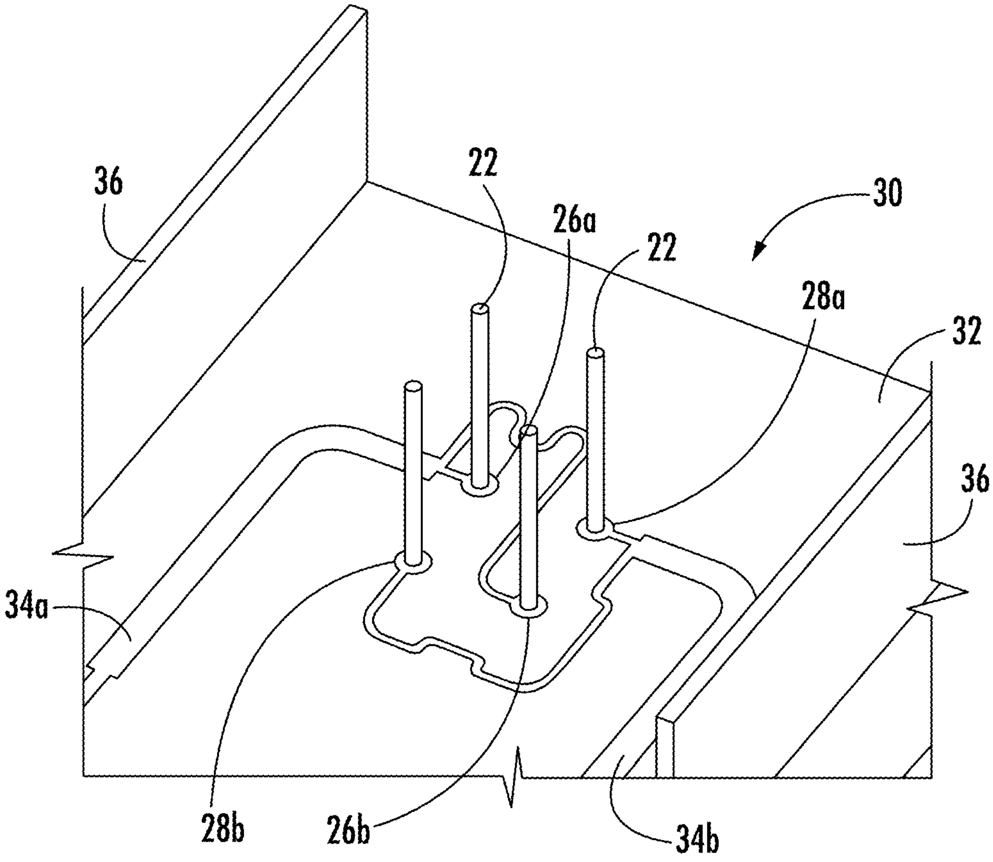
FIG. 1E is a perspective view of a forward-facing surface of a cross-polarized feed signal network with metallized inter-column fences thereon and RF signal probes connected to corresponding feed signal output ports, according to an embodiment of the invention.

As shown by FIGS. 1B-1E, the four quadrants Q1-Q4 of the forward-facing surface 12 are electrically connected by a quad arrangement of metal RF signal probes 22 to an underlying cross-polarized feed signal network 30. This feed signal network 30 is configured to convert first and second radio frequency (RF) input feed signals $IN_p$(+45°), $IN_n$ (−45°), which are received at a corresponding pair of feed signal input ports 24*a*, 24*b* (see, e.g., FIG. 9A-9D), into first and second pairs of cross-polarized feed signals p1 (0°, 180°), n1 (0°, 180°) at respective first and second pairs of feed signal output ports (26*a*, 26*b*), (28*a*, 28*b*). In particular, the metal probes 22 have first distal ends, which are soldered into corresponding plated through-holes 18 within the patch radiating element substrate 20, and second distal ends, which may be soldered into the first and second pairs of cross-polarized feed signal output ports (26*a*, 26*b*), (28*a*, 28*b*). As shown by FIG. 1E, the feed signal network 30 may be configured as a selectively metallized substrate 32 (e.g., polymer, PCB) having first and second metal traces 34*a*, 34*b* on a forward-facing surface thereof, which extends between a pair of metallized inter-column fences 36 that are integrated with the substrate 32 as a single piece unitary body. As will be understood by those skilled in the art, these first and second metal traces 34*a*, 34*b* operate to distribute the first and second radio frequency (RF) input feed signals $IN_p$ (+45°), $IN_n$ (−45°), with predetermined phase delays, to a quad-arrangement of plated through-holes 38 within the substrate 32; these plated through-holes 38 may function as the first and second pairs of cross-polarized feed signal output ports (26*a*, 26*b*), (28*a*, 28*b*). In some of these embodiments, the radiating element 10 may have lateral dimensions of $0.37\lambda_0$ by $0.37\lambda_0$, and a thickness of $0.015\lambda_0$ (where $\lambda_0$ is a center operating frequency). The substrate 32 may, in some embodiments, have a dielectric constant equal to about 4.1 (e.g., Fortron™ 1140L4); the slot lengths may be about $0.37\lambda_0$ with a width of about 1.5 mm; the metal/metallized probes may have a height of about $0.15\lambda_0$; and the spacing between metallized fences may be about $0.5\lambda_0$.

Figure 2A:
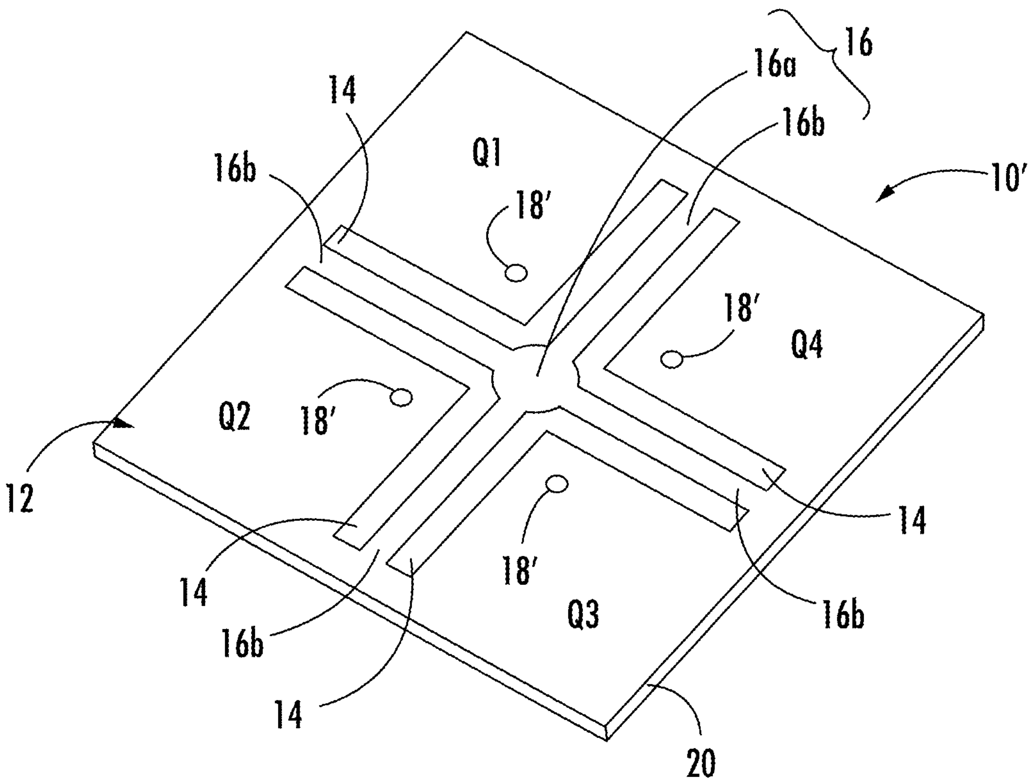
FIG. 2A is a perspective view of a metallized forward-facing surface of a rectangular-shaped patch radiating element having four L-shaped slots therein, according to an embodiment of the invention.
Figure 2B:
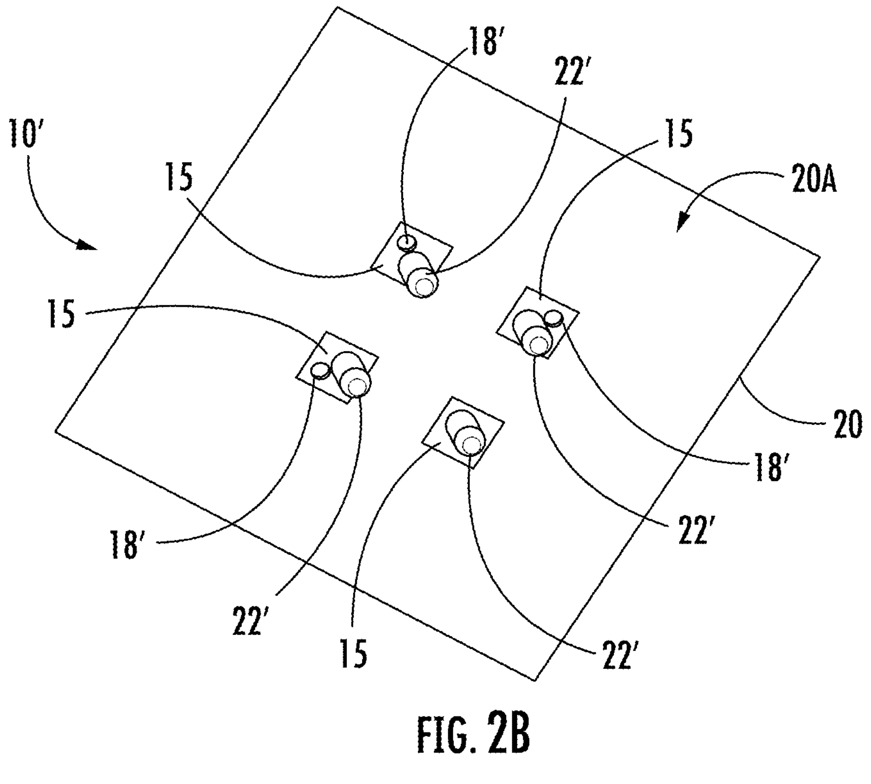
FIG. 2B is a perspective view of a rear-facing surface of the rectangular-shaped patch radiating element of FIG. 2A with integrated probes and metallized contact patches, according to an embodiment of the invention.
Figure 2C:
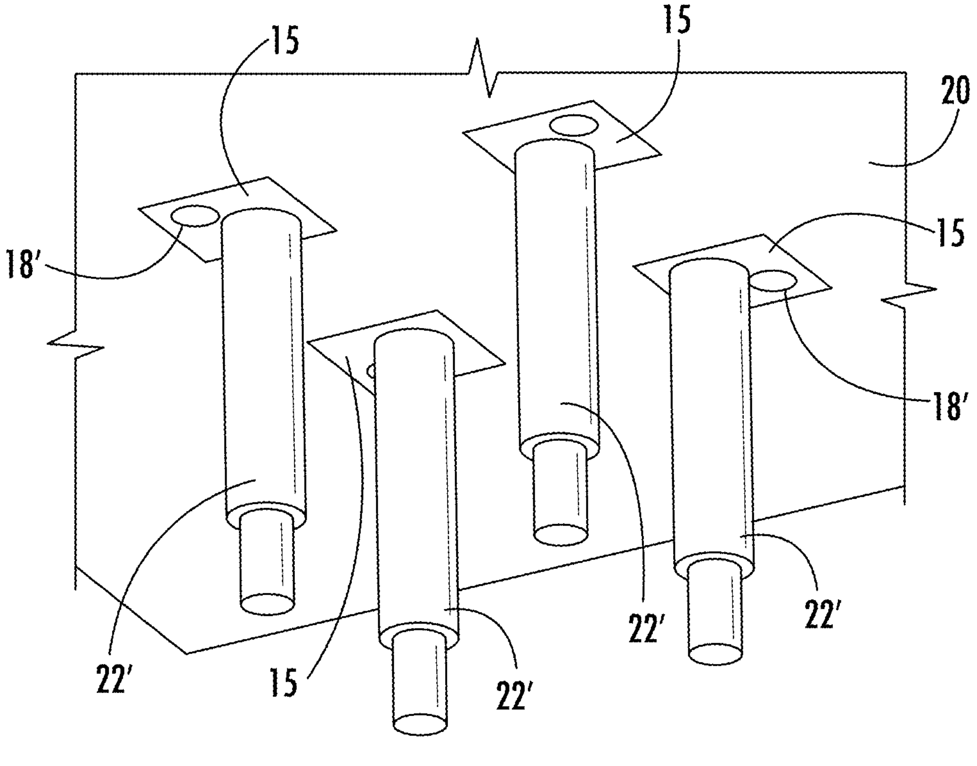
FIG. 2C is an enlarged perspective view of a portion of the rear-facing surface of FIG. 2B, which shows the integrated probes, metallized contact patches and metallized/plated through-holes within a patch radiating element substrate, according to an embodiment of the invention.

Referring now to FIGS. 2A-2C, an antenna according to another embodiment of the invention is illustrated as including a patch radiating element 10' that is similar to the patch radiating element 10 of FIGS. 1A-1D, however, the RF signal probes 22 of FIGS. 1B-1E are replaced with four metallized-polymer probes 22', which are electrically connected to metallized contact patches 15 on a rear-facing surface 20*a* of the patch radiating element substrate 20. As shown, these metallized contact patches 15 are electrically connected by respective plated through-holes 18' within the patch radiating element substrate 20 to corresponding quadrants Q1-Q4 of the electrically conductive forward-facing surface 12. Advantageously, the patch radiating element substrate 20 and the four metallized-polymer probes 22' can be configured as a unitary polymer body having selectively metallized surfaces thereon, as shown.

Next, as shown by FIGS. 3A-3D, an antenna according to another embodiment of the invention is illustrated as including a patch radiating element 10'' that is similar to the patch radiating element 10 of FIGS. 1A-1D, however, the metal probes 22 of FIGS. 1B-1E are replaced with a quad arrangement of metal probes 22'', which may be formed from bent sheet metal. These metal probes 22" have: (i) relatively large area and arcuate-shaped ends 42*a*, which are attached to a rear-facing surface 20*a* of the patch radiating substrate 20 and capacitively coupled (through the substrate 20) to respective quadrants Q1-Q4 of the forward-facing surface 12', and (ii) rectangular-shaped "flat" ends 42*b*, which can be electrically connected to plated and rectangular-shaped through-holes (within an underlying substrate), which operate as cross-polarized feed signal output ports of a feed signal network (not shown) that is similar to the feed signal network 30 of FIGS. 1E and 9A. The use of RF feed signal lines having arcuate-shaped distal ends, which are capacitively coupled to a patch radiator of an antenna, is more fully disclosed in commonly assigned U.S. application Ser. No. 17/611,399, filed Nov. 15, 2021, the disclosure of which is hereby incorporated herein by reference.

Figure 3A:
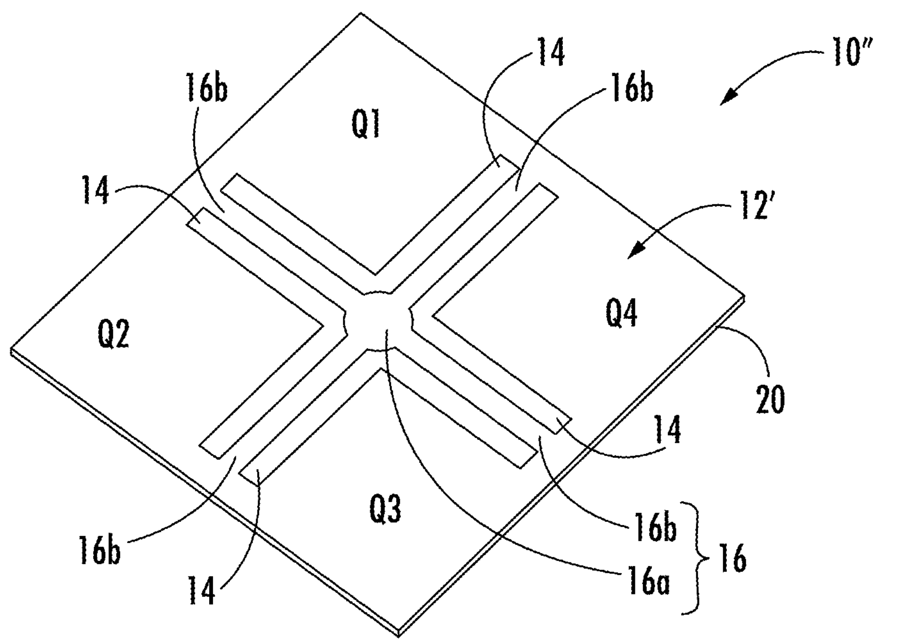
FIG. 3A is a perspective view of a metallized forward-facing surface of a patch radiating element with four L-shaped slots therein, according to an embodiment of the invention.
Figure 3B:
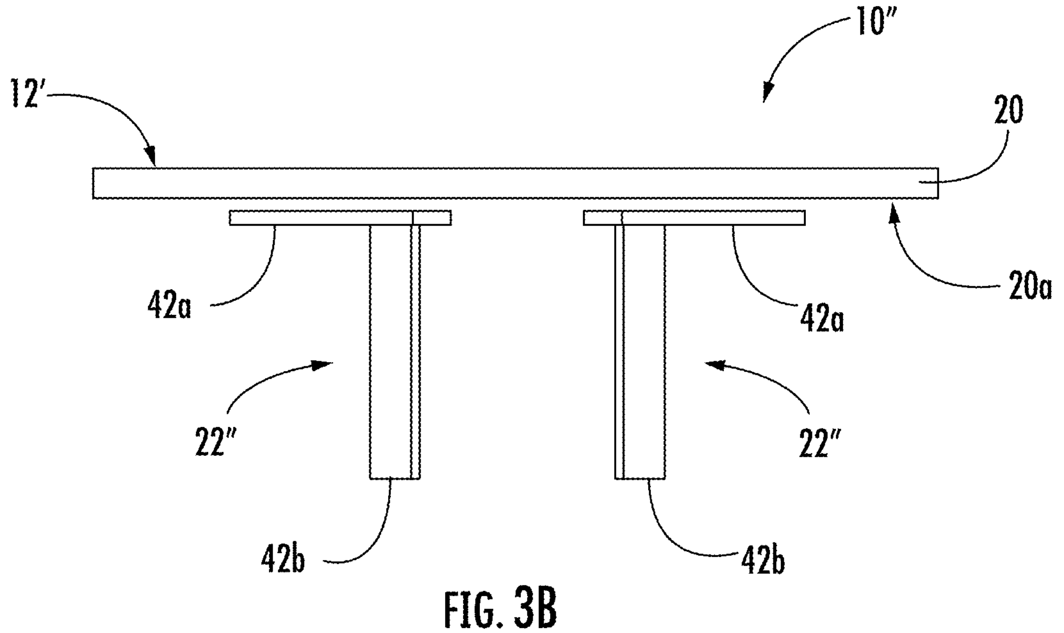
FIG. 3B is a side perspective view of the patch radiating element of FIG. 3A with capacitively-coupled RF signal probes, according to an embodiment of the invention.
Figure 3C:
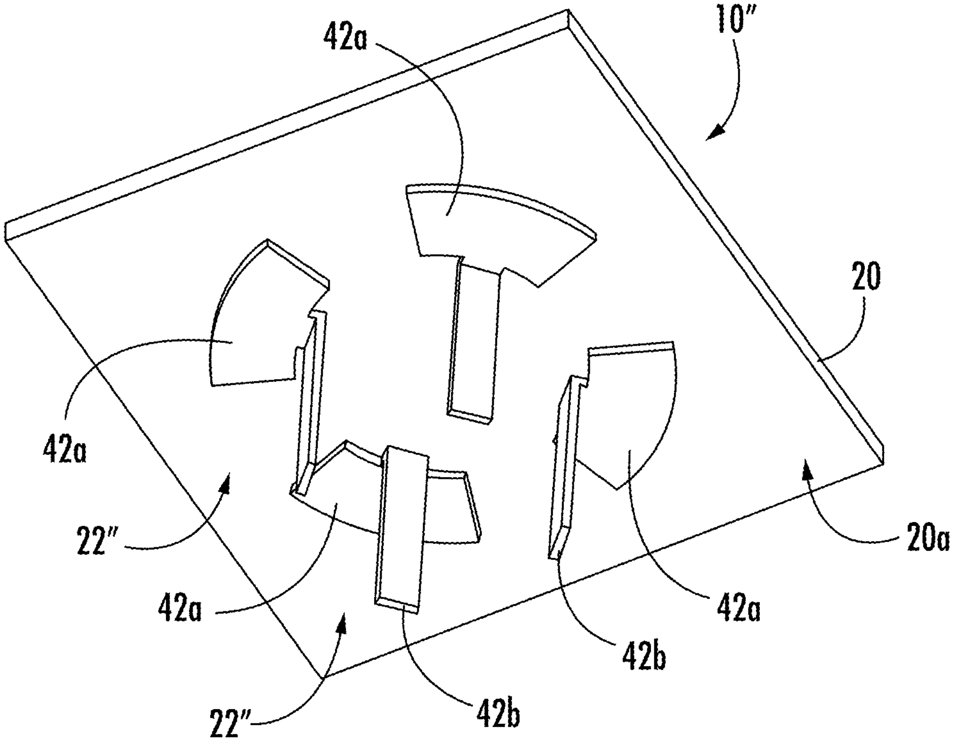
FIG. 3C is a rear perspective view of the patch radiating element of FIGS. 3A-3B, according to an embodiment of the invention.
Figure 3D:
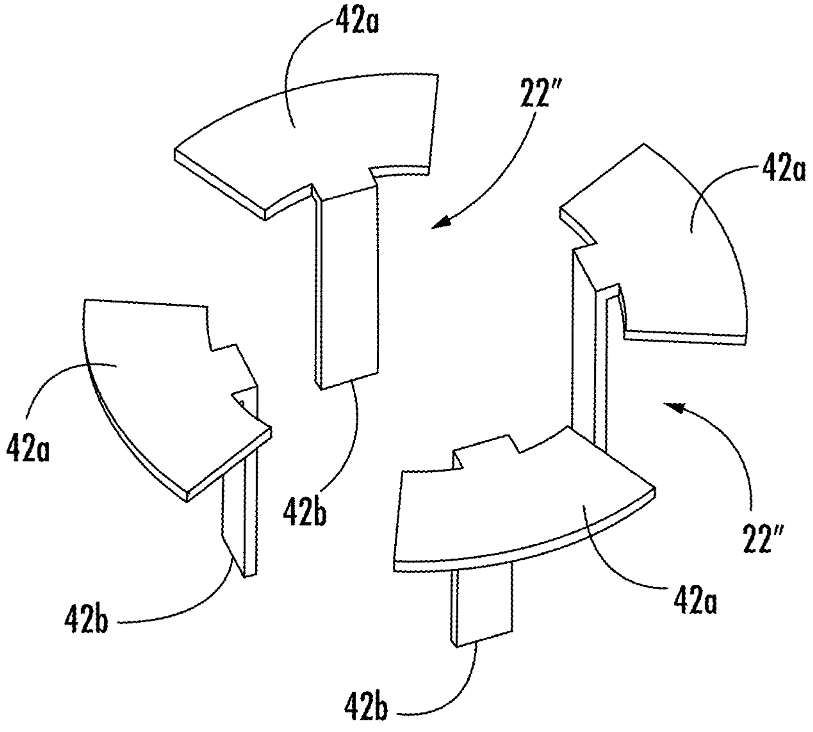
FIG. 3D is a perspective view of the RF signal probes of FIGS. 3B-3C, with arcuate-shaped ends, according to an embodiment of the invention.
Figure 4A:
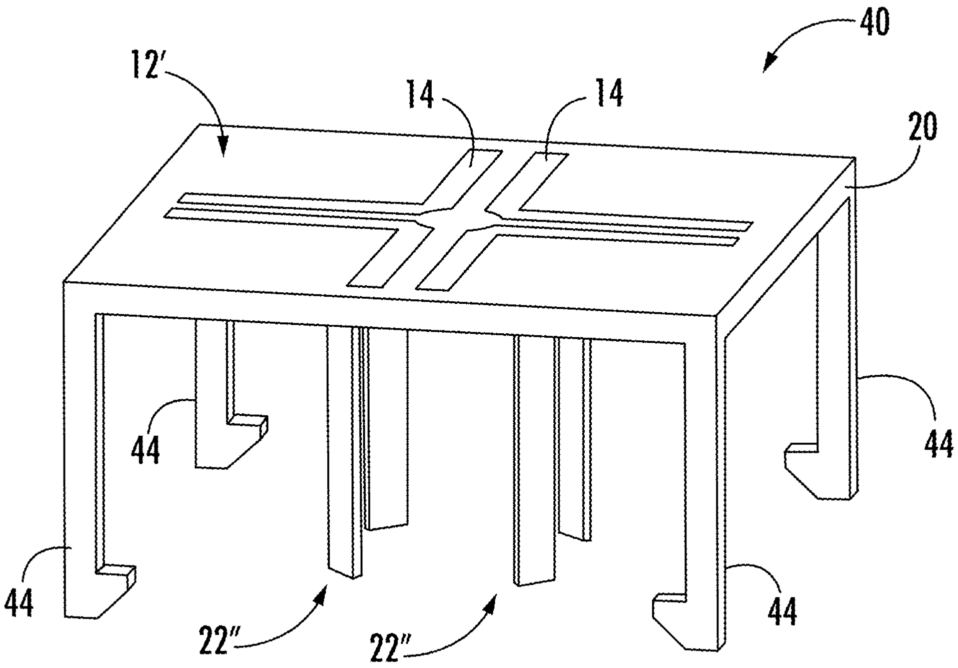
FIG. 4A is a perspective view of a metallized forward-facing surface of a patch radiating element having four L-shaped slots therein, four capacitively-coupled RF signal probes extending to a rear-facing surface of the patch radiating element, and four elongate mounting prongs/clips integrated into corresponding corners of the patch radiating element, according to an embodiment of the invention.
Figure 4B:
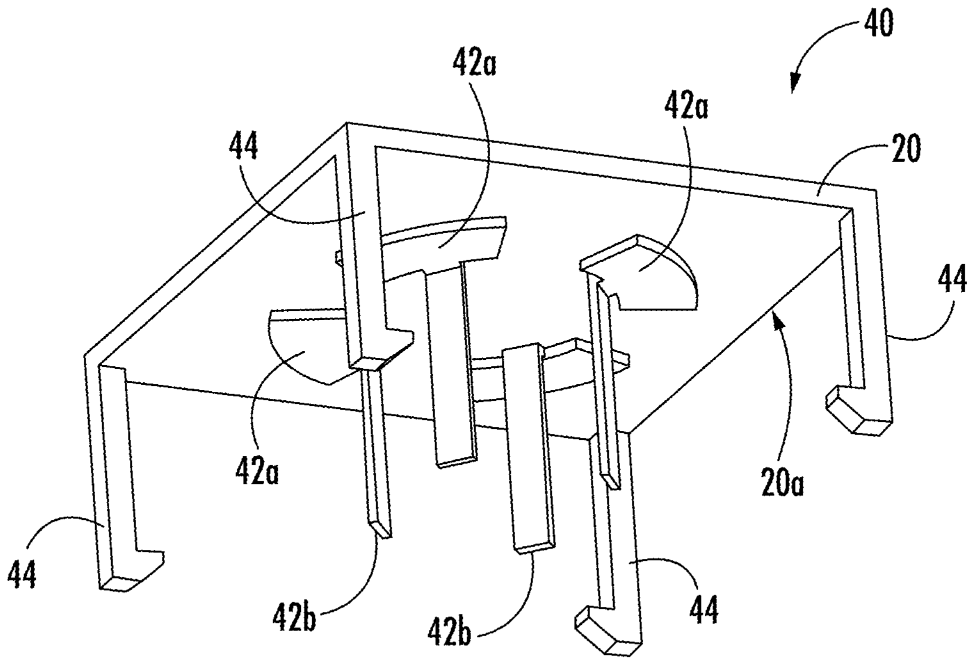
FIG. 4B is a perspective view of a rear-facing surface of the patch radiating element of FIG. 4A, according to an embodiment of the invention.
Figure 9A:
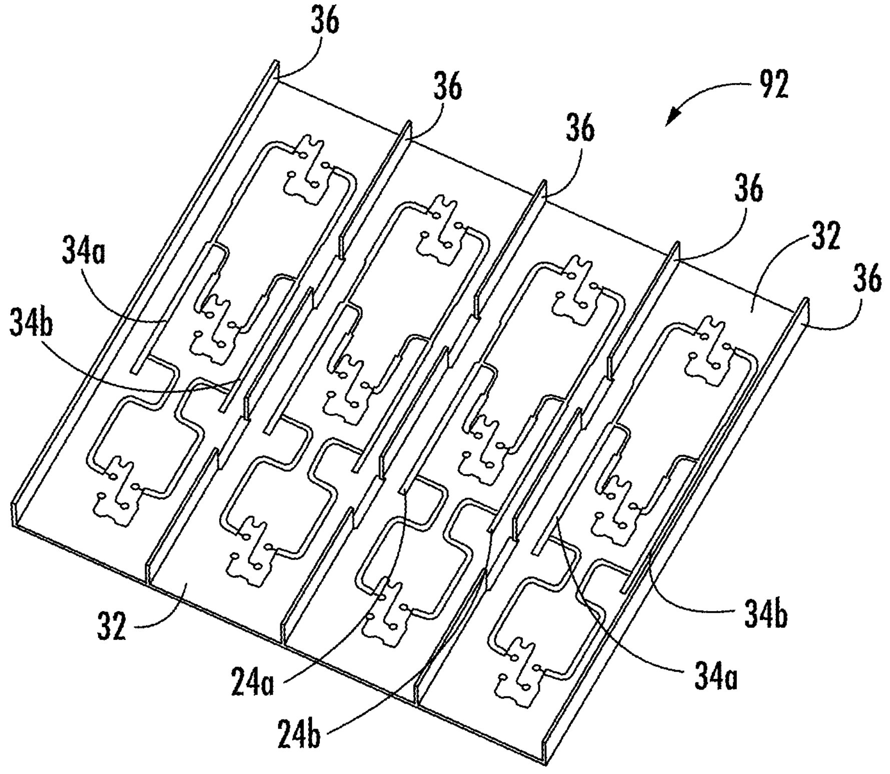
FIG. 9A is a front perspective view of a 3-row by 4-column cross-polarized feed signal network with inter-column metallized isolation fences, according to an embodiment of the invention.

Referring now to "front" and "rear" perspective views of FIGS. 4A-4B, an alternative patch radiating element 40 is illustrated as essentially identical to the patch radiating element 10" of FIG. 3A-3D, however, each corner of the patch radiating element 40 is illustrated as including an elongate mounting prong/clip 44, which extends rearwardly therefrom and, upon assembly, is received within corresponding attachment slot (not shown) within an underlying feed signal network that is similar to the feed signal network 30 of FIGS. 1E and 9A.

Figure 5A:
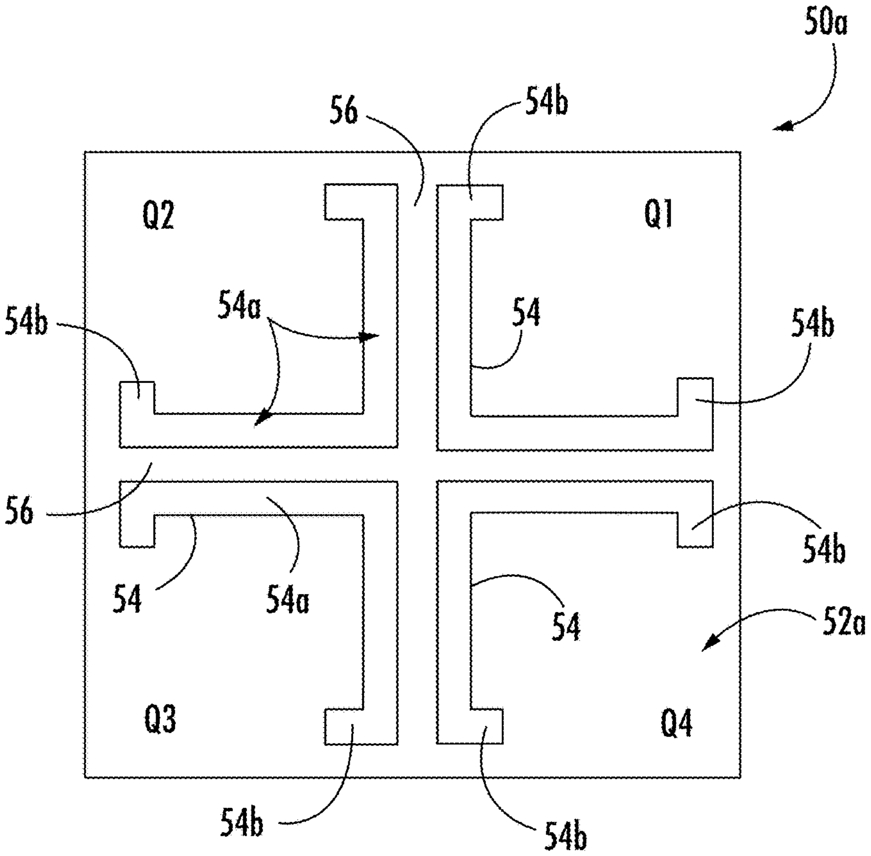
FIG. 5A is a plan view of a forward-facing metallized surface of a rectangular patch radiating element with four L-shaped slots therein (having L-shaped ends), which partition the metallized surface into four quadrants, according to an embodiment of the invention.

Referring now to FIG. 5A, an alternative embodiment to the patch radiating elements 10, 10' and 10" of FIGS. 1A, 2A and 3A is shown by a patch radiating element 50*a* having an electrically conductive forward-facing surface 52*a* thereon, which may be used as a substitute for the forward-facing surfaces of the antennas described hereinabove. As shown, the forward-facing surface 52*a* is segmented into four quadrants Q1-Q4 by four generally L-shaped slots 54, which are positioned back-to-back relative each other so that a cross-shaped portion 56 of the electrically conductive forward-facing surface 52*a* extends between the four generally L-shaped slots 54. Moreover, in contrast to the L-shaped slots 14 of FIGS. 1A, 2A and 3A, each of the L-shaped slots 54 of FIG. 5A includes a pair of linear slot segments 54*a*, which extend at right angles relative to each other and terminate with L-shaped ends 54*b* that extend at right angles relative to their respective linear slot segments 54*a*.

Figure 5B:
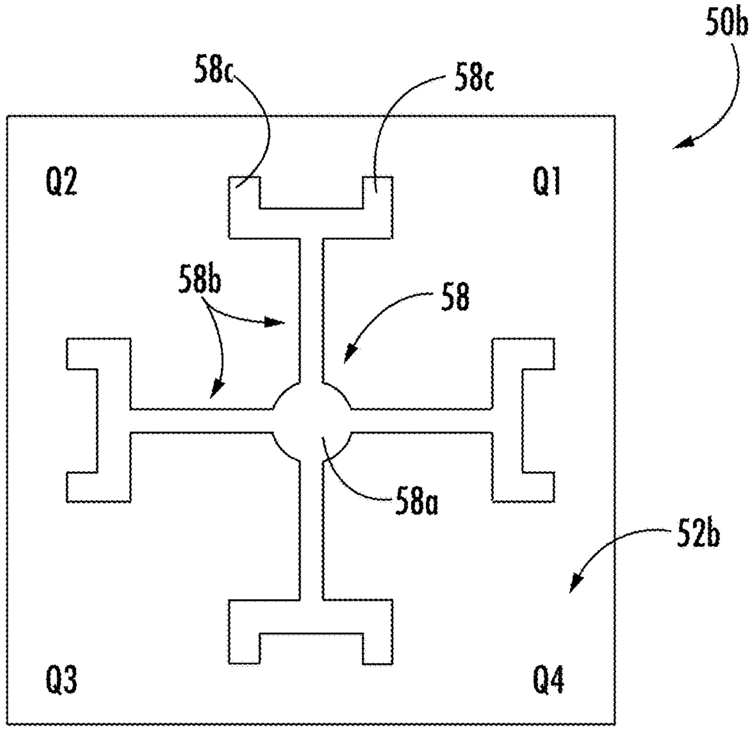
FIG. 5B is a plan view of a forward-facing metallized surface of a rectangular patch radiating element having a slot therein, which includes a circular central hub segment and four fork-shaped spoke segments, according to an embodiment of the invention.
Figure 5C:
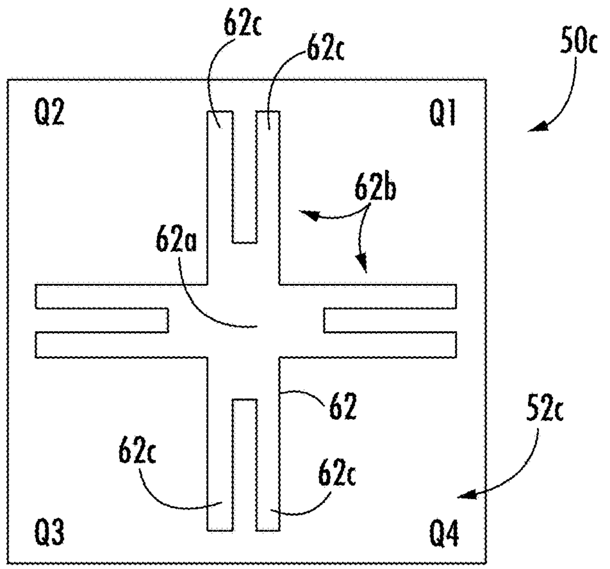
FIG. 5C is a plan view of a forward-facing metallized surface of a rectangular patch radiating element having a slot therein, which includes a square-shaped central hub segment and four fork-shaped spoke segments, according to an embodiment of the invention.

Referring now to FIG. 5B, a patch radiating element 50*b* according to another embodiment of the invention is illustrated as including an electrically conductive forward-facing surface 52*b* thereon, which may be used as a substitute for the forward-facing surfaces of the antennas described hereinabove. As shown, this forward-facing surface 52*b* is segmented into four quadrants Q1-Q4 by a slot 58 having a generally circular-shaped central hub segment 58*a* that is contiguous with four fork-shaped spoke segments 58*b*, which extend radially outward at 0°, 90°, 180° and 270° from to the central hub segment 58*a* when viewed from a plan perspective. In addition, each of these fork-shaped spoke segments 58*b* includes a pair of segments 58*c* at distal ends thereof that define two tines of the respective fork-shaped spoke segment 58*b*. Similarly, as shown by FIG. 5C, a patch radiating element 50*c* according to another embodiment of the invention is illustrated as including an electrically conductive forward-facing surface 52*c* thereon, which may be used as a substitute for the forward-facing surfaces of the antennas described hereinabove. As shown, this forward-facing surface 52*c* is segmented into four quadrants Q1-Q4 by a slot 62 having a square-shaped central hub segment 62*a* that is contiguous with four fork-shaped spoke segments 62*b*, which extend radially outward at 0°, 90°, 180° and 270° from to the central hub segment 62*a*. In addition, each of these fork-shaped spoke segments 62*b* includes a pair of segments 62*c* at distal ends thereof that define two tines of the respective fork-shaped spoke segment 62*b*.

Figure 5D:
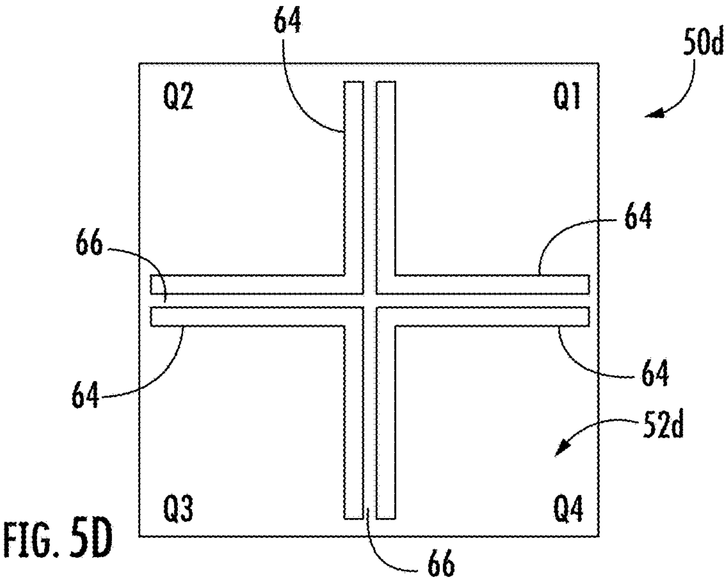
FIG. 5D is a plan view of a forward-facing metallized surface of a rectangular patch radiating element having four L-shaped slots therein, which partition the metallized surface into four quadrants, according to an embodiment of the invention.
Figure 5E:
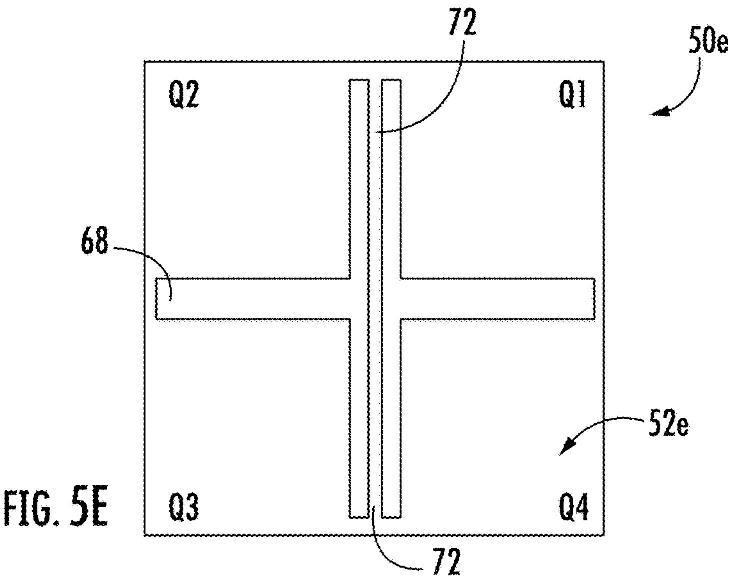
FIG. 5E is a plan view of a forward-facing metallized surface of a rectangular patch radiating element having two T-shaped slots therein, which partition the metallized surface into four quadrants, according to an embodiment of the invention.

Referring now to FIG. 5D, a patch radiating element 50*d* according to another embodiment of the invention is illustrated as including an electrically conductive forward-facing surface 52*d* thereon, which may be used as a substitute for the forward-facing surfaces described hereinabove. As shown, this forward-facing surface 52*d* is segmented into four quadrants Q1-Q4 by four L-shaped slots 64, which are positioned back-to-back relative each other so that a cross-shaped portion 66 of the electrically conductive forward-facing surface 52*d* extends between the four generally L-shaped slots 64. This cross-shaped portion 66 is similar to the cross-shaped portion 16 of FIG. 1A, however, the generally circular-shaped central hub portion 16*a* is omitted. Next, as shown by FIG. 5E, a patch radiating element 50*e* according to another embodiment of the invention is illustrated as including an electrically conductive forward-facing surface 52*e* thereon, which is segmented into four quadrants Q1-Q4 by two back-to-back T-shaped slots 68 that define, among other things, a linear trace 72 of the forward-facing surface 52*e* extending therebetween.

Figure 6A:
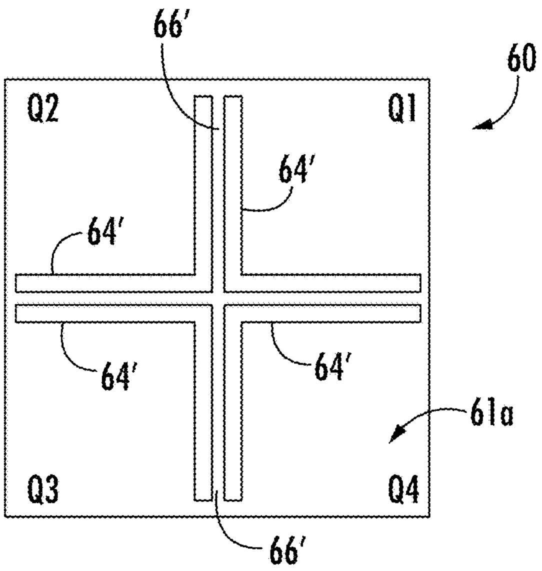
FIG. 6A is a plan view of a forward-facing metallized surface of a rectangular patch radiating element having four L-shaped through-slots therein, which partition the metallized surface into four quadrants, according to an embodiment of the invention.
Figure 6B:
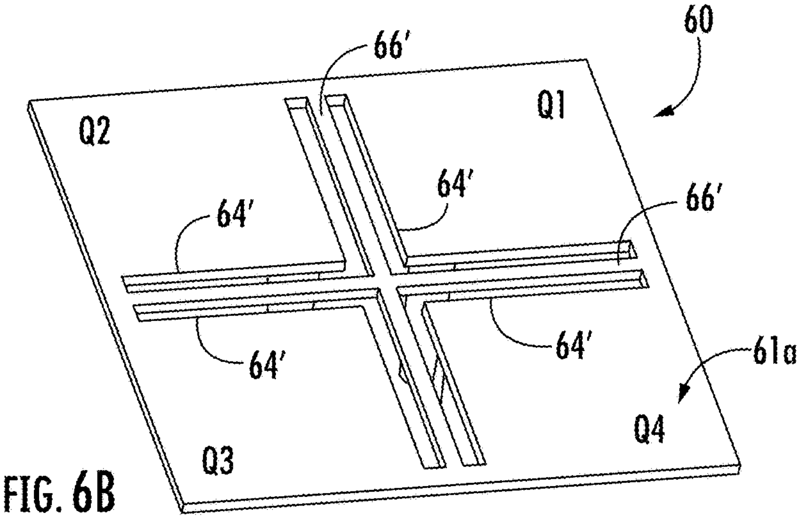
FIG. 6B is a perspective view of the patch radiating element of FIG. 6A, according to an embodiment of the invention.
Figure 6C:
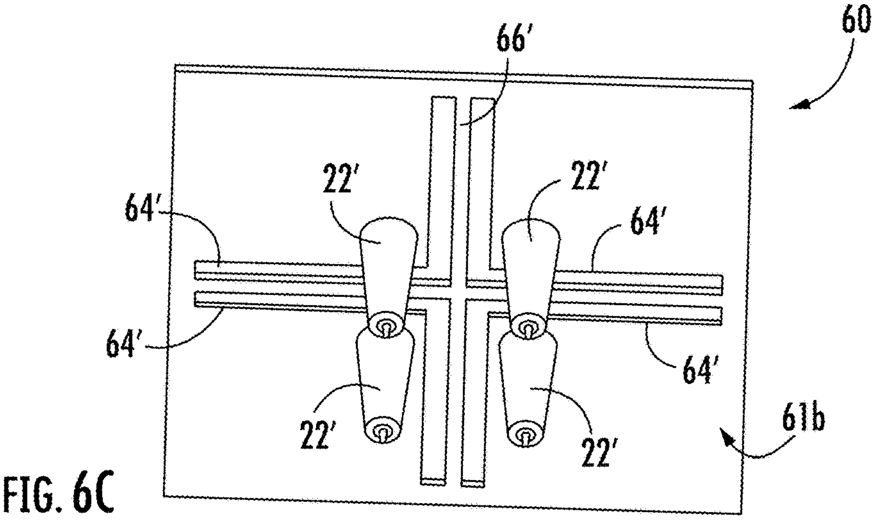
FIG. 6C is a perspective view of a rear-facing surface of the patch radiating element of FIG. 6A with four integrated probes (e.g., metallized plastic), according to an embodiment of the invention.
Figure 7A:
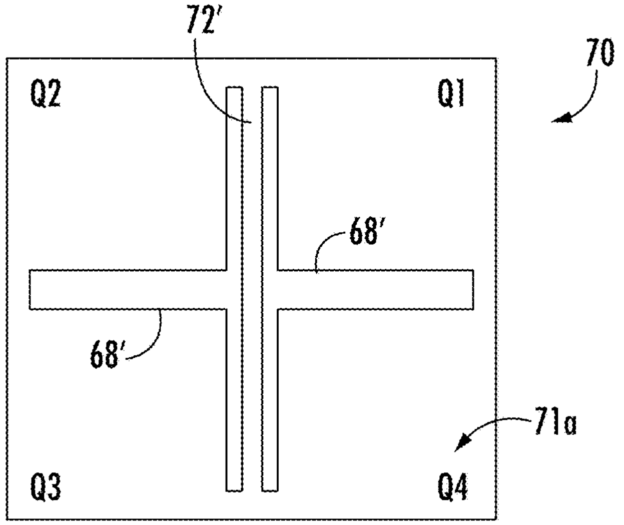
FIG. 7A is a plan view of a forward-facing metallized surface of a rectangular patch radiating element having two T-shaped through-slots therein, which partition the metallized surface into four quadrants, according to an embodiment of the invention.
Figure 7B:
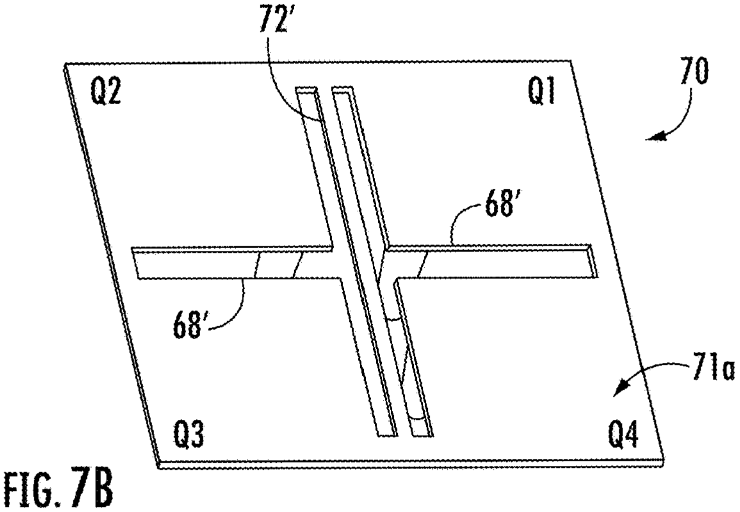
FIG. 7B is a perspective view of the patch radiating element of FIG. 7A, according to an embodiment of the invention.
Figure 7C:
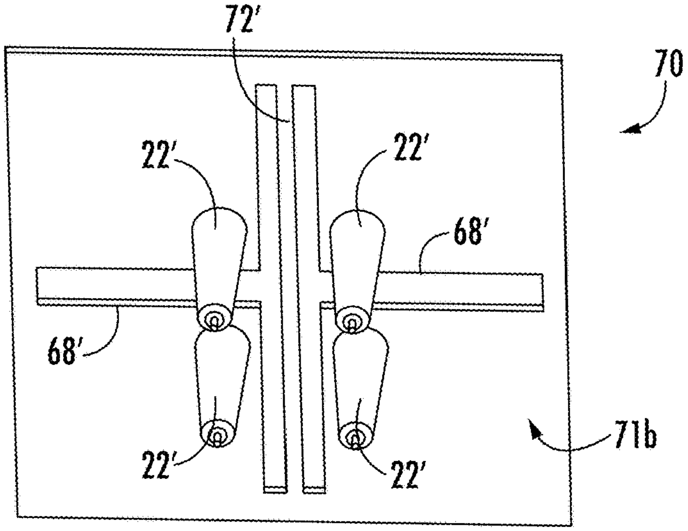
FIG. 7C is a perspective view of a rear-facing surface of the patch radiating element of FIG. 7A with four integrated probes (e.g., metallized plastic), according to an embodiment of the invention.

Referring now to FIGS. 6A-6C, a patch radiating element 60 according to another embodiment of the invention is shown as including: (i) metallized forward and rear facing surfaces 61*a*, 61*b* (including metallized cross-shaped portion 66'), and (ii) four L-shaped through-slots 64' having metallized sidewalls that electrically connect quadrants Q1-Q4 of the forward and rear facing surfaces 61*a*, 61*b* together. In addition, four metallized signal probes 22' are provided, which are integrated into corresponding ones of the quadrants on the rear facing surface 61*b*. As described hereinabove with respect to FIGS. 2A-2C, the patch radiating element 60 and signal probes 22" may be configured as a unitary metallized plastic (e.g., nylon) body, which can be attached to an underlying feed signal network 30, as shown by FIGS. 1E and 9A. Similarly, as shown by FIGS. 7A-7C, a patch radiating element 70 according to another embodiment of the invention is shown as including: (i) metallized forward and rear facing surfaces 71*a*, 71*b* (including metallized linear trace 72'), and (ii) two back-to-back T-shaped through-slots 68' having metallized sidewalls that electrically connect quadrants Q1-Q4 of the forward and rear facing surfaces 71*a*, 71*b* together. In addition, four metallized signal probes 22' are provided, which are integrated as a unitary body into corresponding ones of the quadrants on the rear facing surface 71*b*.

Figure 8A:
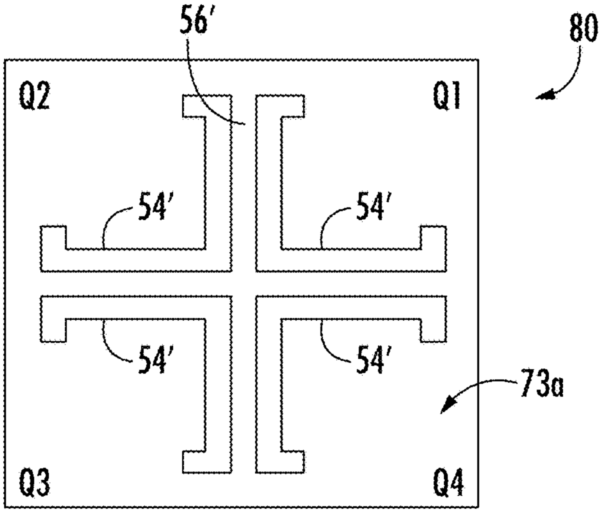
FIG. 8A is a plan view of a forward-facing metallized surface of a rectangular patch radiating element having four L-shaped through-slots therein, which partition the metallized surface into four quadrants, according to an embodiment of the invention.
Figure 8B:
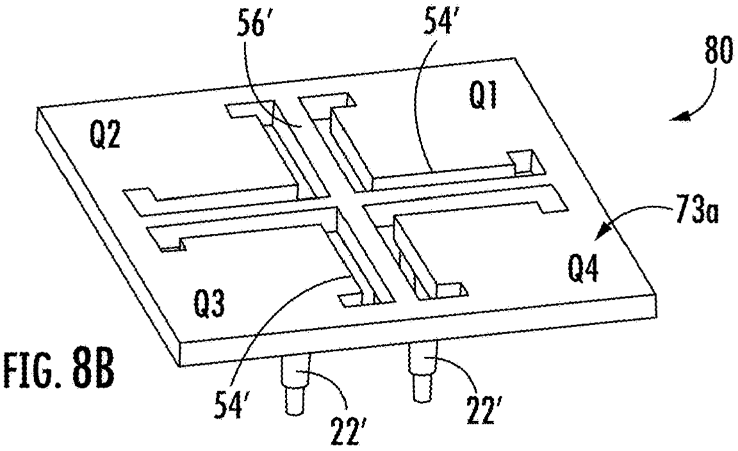
FIG. 8B is a perspective view of the patch radiating element of FIG. 8A, according to an embodiment of the invention.
Figure 8C:
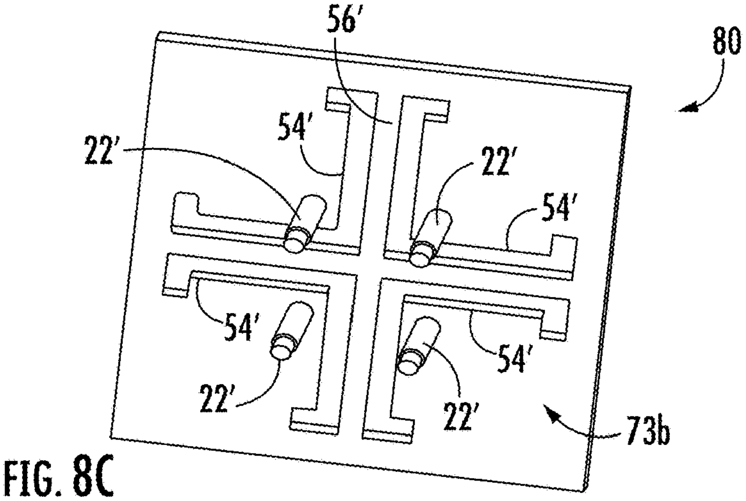
FIG. 8C is a perspective view of a rear-facing surface of the patch radiating element of FIG. 8A with four integrated probes (e.g., metallized plastic), according to an embodiment of the invention.
Figure 10A:
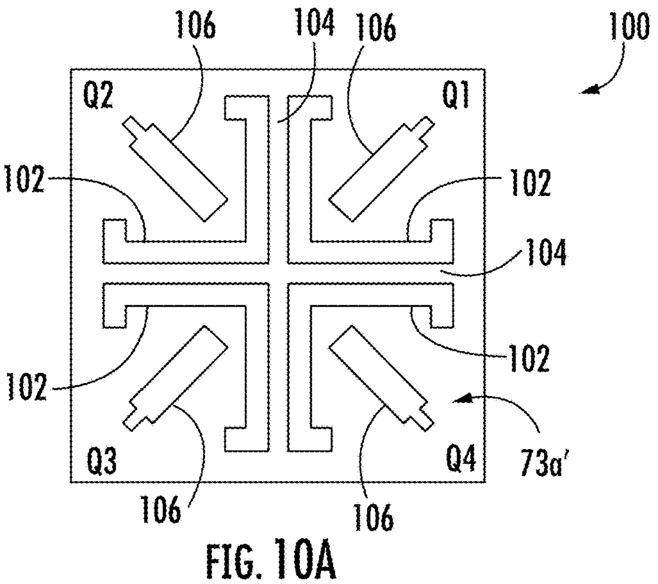
FIG. 10A is a plan view of a rectangular patch radiating element having four L-shaped slots therein along with four feed probe cutouts, which extend rearwardly relative to a forward-facing surface of the radiating element, according to an embodiment of the invention.
Figure 10B:
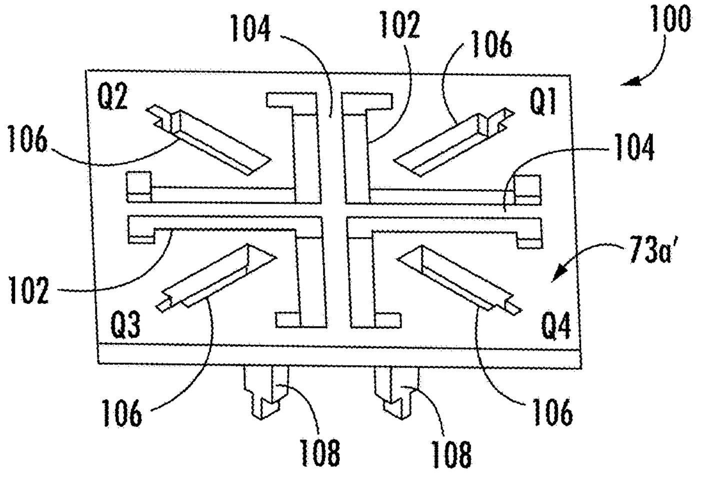
FIG. 10B is a perspective view of the patch radiating element of FIG. 10A, according to an embodiment of the invention.
Figure 10C:
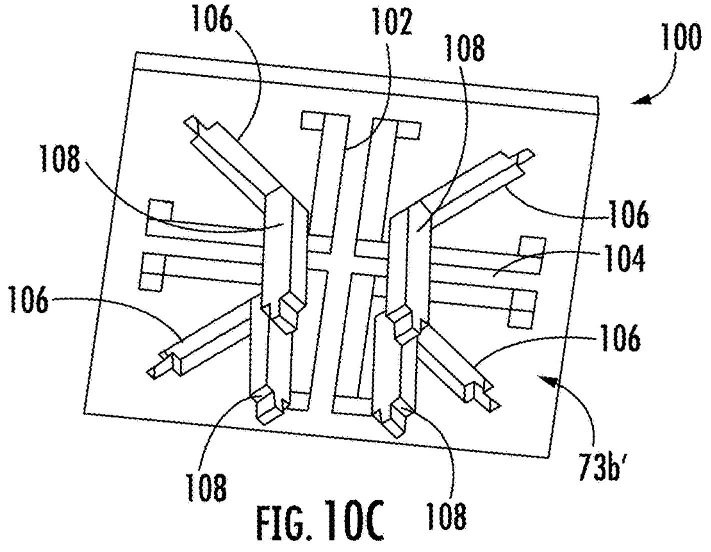
FIG. 10C is a perspective view of a rear-facing surface of the patch radiating element of FIG. 10A with four feed probe cutouts, according to an embodiment of the invention.

Next, as shown by FIGS. 8A-8C, a patch radiating element 80 according to another embodiment of the invention is shown as including: (i) metallized forward and rear facing surfaces 73*a*, 73*b* (including metallized cross-shaped portion 56'), and (ii) four generally L-shaped through-slots 54' having metallized sidewalls that electrically connect quadrants Q1-Q4 of the forward and rear facing surfaces 73*a*, 73*b* together. In addition, four metallized signal probes 22' are provided, which are integrated as a unitary body into corresponding ones of the quadrants on the rear facing surface 73*b*. Moreover, as shown by FIGS. 10A-10C, an alternative patch radiating element 100, which may be formed from a single piece of stamped sheet metal, includes a plurality of generally L-shaped slots 102 (that define a cross-shaped portion 104 of the forward-facing surface 73*a'*), and a quad-arrangement of feed-probe cutouts 106. Advantageously, these cutouts 106 can be defined by stamping and bending the forward-facing surface 73$a'$ into a quad arrangement of four feed probes 108, which extend rearwardly of a rear-facing surface 73$b'$ of the radiating element 100.

Figure 9B:
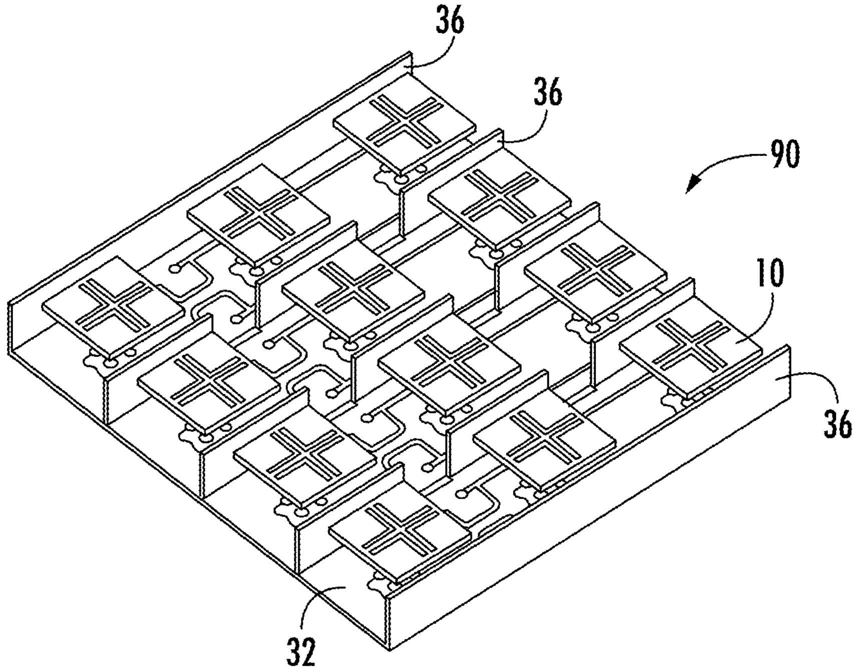
FIG. 9B is a perspective view of an antenna containing a 3-row by 4-column array of the patch radiating elements of FIG. 1A and the feed signal network of FIG. 9A, according to an embodiment of the invention.

Referring now to FIGS. 9A-9B, a 3-row by 4-column antenna 90 according to an embodiment of the invention utilizes a 3-row by 4-column cross-polarized feed signal network 92 and corresponding radiating elements 10 mounted thereon, which is suitable for massive MIMO and other RF communication systems. As shown, this feed signal network 92 includes: (i) a selectively metallized substrate 32 (e.g., polymer, PCB) having four columns of metal trace pairs 34*a*, 34*b* on a forward-facing surface thereof, and (ii) metallized inter-column and side fences 36, which are integrated with the substrate 32 as a single piece unitary body. As will be understood by those skilled in the art, each of the pairs of metal traces 34*a*, 34*b* operate to distribute the first and second radio frequency (RF) input feed signals $INn_p$ (+45°), $INn_n$ (−45°), with predetermined phase delays, to the first and second pairs of cross-polarized feed signal output ports (26*a*, 26*b*), (28*a*, 28*b*) associated with each of three radiating elements 10 within the same column, where "n" ranges from 1 to 4.

Figure 9C:
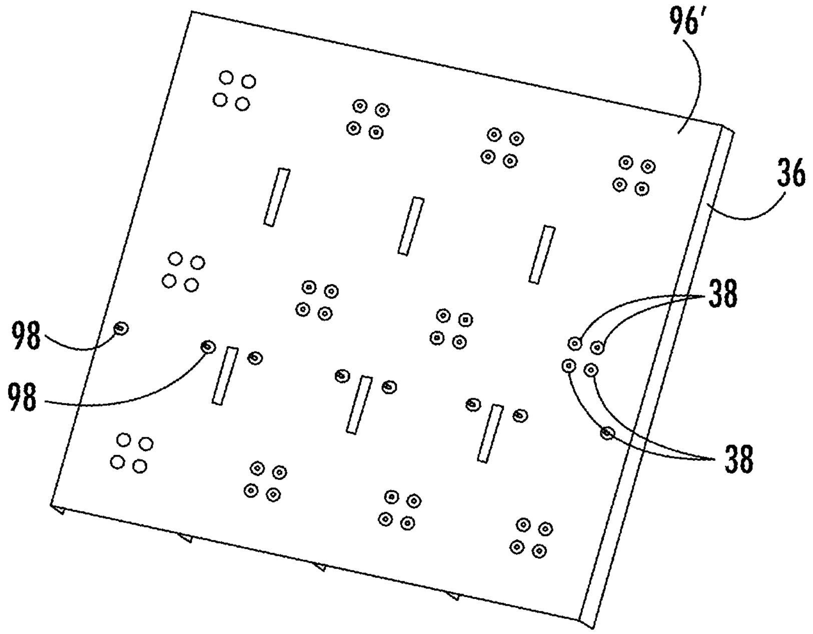
FIG. 9C is a rear perspective view of the cross-polarized feed signal network of FIG. 9A with metallized rear-facing surface, according to an embodiment of the invention.
Figure 9D:
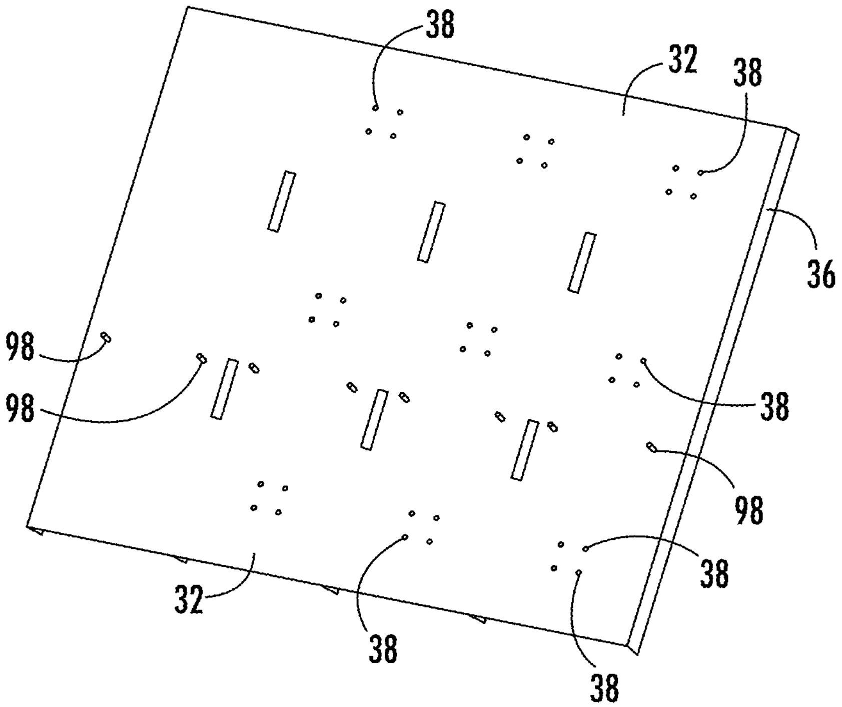
FIG. 9D is a rear perspective view of the cross-polarized feed signal network of FIG. 9A with metal-free rear-facing surface, according to an embodiment of the invention.
Figure 9E:
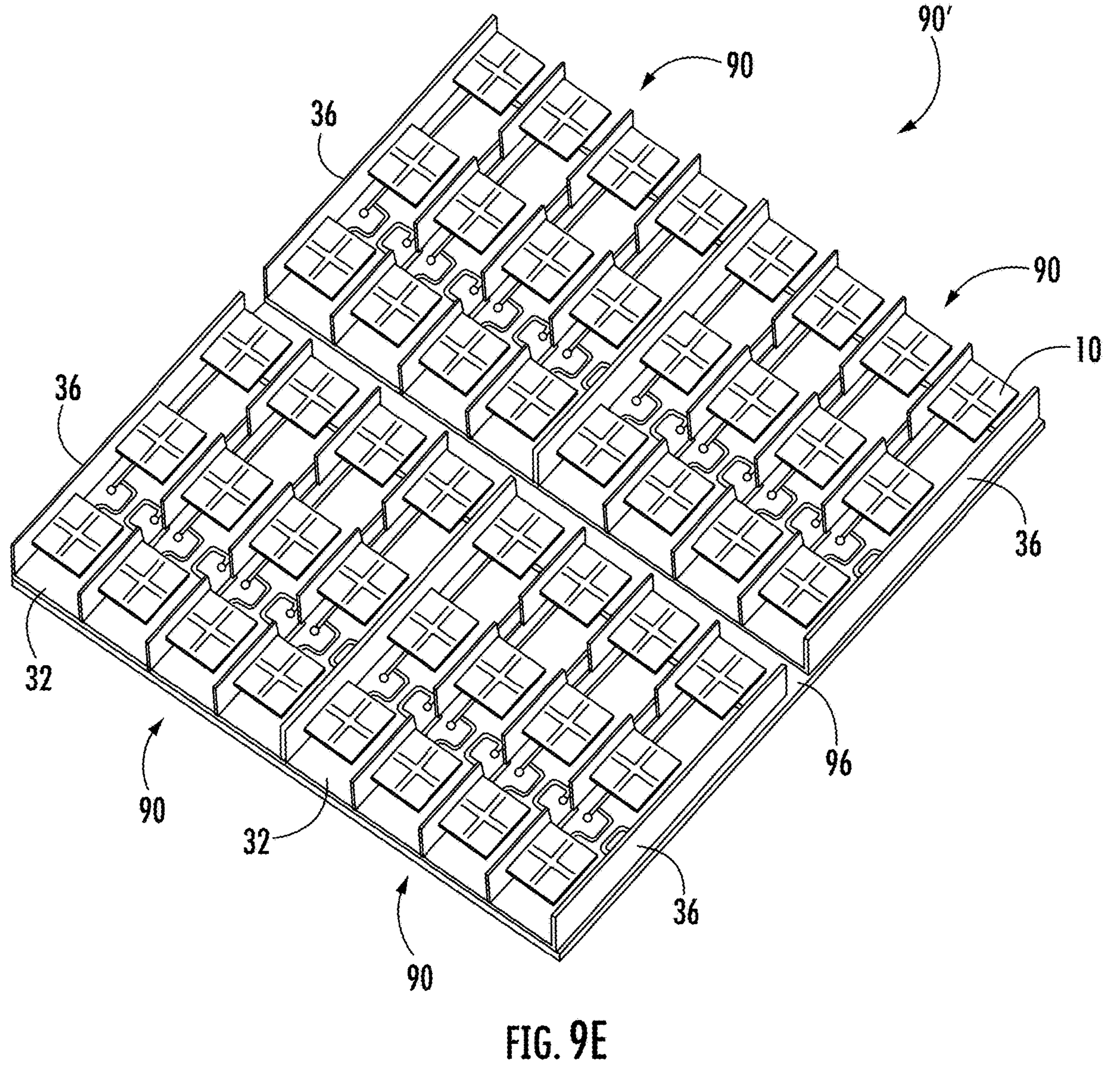
FIG. 9E is a perspective view of an antenna containing a quad-arrangement of the 3-row by 4-column array of patch radiating elements and the feed signal network of FIG. 9A, according to an embodiment of the invention.

As described hereinabove with respect to FIG. 1E, and as shown by the rear perspective view of the cross-polarized feed signal network 92 of FIG. 9C (metallized rear surface/reflector 96') or 9D (metal-free rear surface, with underlying reflector), the plated through-holes 38 (or through-slots) within the substrate 32 may function as the first and second pairs of cross-polarized feed signal output ports (26*a*, 26*b*), (28*a*, 28*b*), which receive corresponding "feed signal" probes (e.g., 22, 22', and 22''). In addition, each of the pairs of first and second radio frequency (RF) input feed signals $INn_p$ (+45°), $IN_n$ n (−45°) may be provided to corresponding pairs of plated through holes 98 within the substrate 32, which operate as the pair of feed signal input ports 24*a*, 24*b*. Finally, as shown by FIG. 9E, a 6-row by 8-column antenna 90' may be configured by assembling a quad arrangement of the feed signal network 92 and radiating elements 10 of FIGS. 9A-9B on an underlying reflector plane 96.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna, comprising:

a cross-polarized feed signal network configured to convert first and second radio frequency (RF) input feed signals to first and second pairs of cross-polarized feed signals at respective first and second pairs of feed signal output ports; and a patch radiating element electrically coupled to the first and second feed pairs of signal output ports, said patch radiating element having an electrically conductive forward-facing surface thereon that is segmented into four quadrants by four generally L-shaped slots within the electrically conductive forward-facing surface, said four generally L-shaped slots positioned back-to-back relative each other so that a cross-shaped portion of the electrically conductive forward-facing surface extends between the four generally L-shaped slots and radially outward towards four respective points on a perimeter of the patch radiating element, four probes, which electrically couple respective ones of the four quadrants of the electrically conductive forward-facing surface to corresponding ones of the first and second pairs of feed signal output ports, where each probe electrically connects to the patch radiating element at a respective location that is positioned radially outwardly of a respective one of generally-L-shaped slots and that is in between the two segments that form the respective generally-L-shaped slots.

2. The antenna of claim 1, wherein said patch radiating element has a rectangular-shaped perimeter; and wherein the cross-shaped portion of the electrically conductive forward-facing surface extends radially outward towards four respective sides of the patch radiating element.

3. The antenna of claim 2, wherein a center of the cross-shaped portion of the electrically conductive forward-facing surface is aligned to a geometric center of the electrically conductive forward-facing surface.

4. The antenna of claim 1, wherein the electrically conductive forward-facing surface is a metallized surface, which extends on a forward-facing surface of a patch radiating element substrate; and wherein the four generally L-shaped slots expose the forward-facing surface of the patch radiating element substrate.

5. The antenna of claim 4, wherein the four probes electrically couple respective ones of the four quadrants of the electrically conductive forward-facing surface to corresponding ones of the first and second pairs of feed signal output ports.

6. The antenna of claim 5, wherein the four probes have distal ends that extend at least partially through the patch radiating element substrate.

7. The antenna of claim 4, wherein the four probes have (i) first ends electrically coupled to corresponding ones of the first and second pairs of feed signal output ports, and (ii) second arcuate-shaped ends, which extend on a rear-facing surface of the patch radiating element substrate.

8. The antenna of claim 7, wherein each of the second arcuate-shaped ends is capacitively coupled through the patch radiating element substrate to a corresponding one of the four quadrants of the electrically conductive forward-facing surface.

9. The antenna of claim 4, wherein each of the four generally L-shaped slots includes a pair of linear slot segments having generally L-shaped ends.

10. The antenna of claim 1, wherein four generally L-shaped slots are patterned such that the cross-shaped portion of the electrically conductive forward-facing surface includes a central hub portion and four spoke portions that extend radially outward at 0°, 90°, 180° and 270° from a center of the central hub portion.

11. The antenna of claim 10, wherein the central hub portion has a generally circular shape when viewed from a plan perspective.

12. An antenna, comprising:

a cross-polarized feed signal network configured to convert first and second radio frequency (RF) input feed signals to first and second pairs of cross-polarized feed signals at respective first and second pairs of feed signal output ports;

a patch radiating element electrically coupled to the first and second feed signal output ports, said patch radiating element having an electrically conductive forward-facing surface thereon that is segmented into four quadrants by four generally L-shaped slots within the electrically conductive forward-facing surface, said four generally L-shaped slots positioned back-to-back relative each other so that a cross-shaped portion of the electrically conductive forward-facing surface extends between the four generally L-shaped slots and radially outward towards four respective points on a perimeter of the patch radiating element; and four metallized-polymer probes, which are electrically connected to metallized contact patches on a rear-facing surface of the patch radiating element substrate; and wherein the metallized contact patches are electrically connected by respective plated through-holes within the patch radiating element substrate to corresponding quadrants of the electrically conductive forward-facing surface.

13. The antenna of claim 12, wherein the patch radiating element substrate and the four metallized-polymer probes are configured as a single piece unitary body.

14. An antenna, comprising:

a cross-polarized feed signal network configured to convert first and second radio frequency (RF) input feed signals to first and second pairs of cross-polarized feed signals at respective first and second pairs of feed signal output ports; and a patch radiating element electrically coupled to the first and second feed signal output ports, said patch radiating element having an electrically conductive forward-facing surface thereon that is segmented into four quadrants by four generally L-shaped slots within the electrically conductive forward-facing surface, said four generally L-shaped slots positioned back-to-back relative each other so that a cross-shaped portion of the electrically conductive forward-facing surface extends between the four generally L-shaped slots and radially outward towards four respective points on a perimeter of the patch radiating element;

wherein the patch radiating element comprises a polymer patch radiating element substrate; and wherein the four generally L-shaped slots extend entirely through the polymer patch radiating element substrate.

15. The antenna of claim 14, wherein the polymer patch radiating element substrate includes metallized forward-facing and metallized rear-facing surfaces; and wherein the four generally L-shaped slots have metallized sidewalls, which extend between the metallized forward-facing and metallized rear-facing surfaces.

16. The antenna of claim 15, further comprising four metallized-polymer probes, which are electrically connected to the metallized rear-facing surface of the patch radiating element substrate.

* * * * *